United States Patent [19]

Hayes

[11] 4,270,693
[45] Jun. 2, 1981

[54] ELECTRONIC THERMOSTAT WITH HEAT ANTICIPATION AND CONTROL METHOD INCORPORATING SAME

[75] Inventor: Thomas E. Hayes, Goshen, Ind.

[73] Assignee: Johnson Controls, Inc., Milwaukee, Wis.

[21] Appl. No.: 66,484

[22] Filed: Aug. 13, 1979

[51] Int. Cl.³ ............................ F16C 1/24; F23N 5/20
[52] U.S. Cl. .................................. 236/46 F; 236/1 R; 307/117
[58] Field of Search .................. 236/1 R, 46 F, 46 R, 236/68 B, 78 D; 165/27; 219/492; 307/117

[56] References Cited

U.S. PATENT DOCUMENTS

| 3,942,718 | 3/1976 | Palmieri | 165/26 X |
| 4,193,006 | 3/1980 | Kabat et al. | 328/72 X |

Primary Examiner—William E. Wayner
Attorney, Agent, or Firm—Emrich, Root, Lee, Brown & Hill

[57] ABSTRACT

An electronic thermostat includes digital electronic apparatus for simulating heat anticipation so that in operation, the temperature of the room being heated or cooled does not exhibit excessive overshoot. A sensor generates a signal representative of temperature in the room. In a preferred embodiment, the system compares the temperature signal with a composite set point signal. The composite set point signal is generated by a data processor to effect the following system characteristics: (1) when the temperature signal remains constant and is equal to the set point, the system can cycle approximately six times an hour with a fifty percent duty cycle; (2) a relatively small change in temperature or set point will modify the duty cycle substantially; and (3) if the temperature and set point signals differ by more than a predetermined amount, the system will lock on or off, depending on which is greater.

20 Claims, 13 Drawing Figures

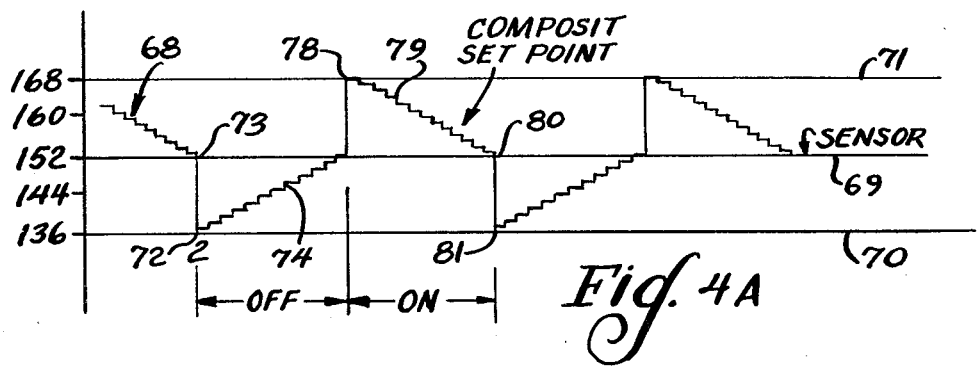
Fig. 4A
Fig. 4B
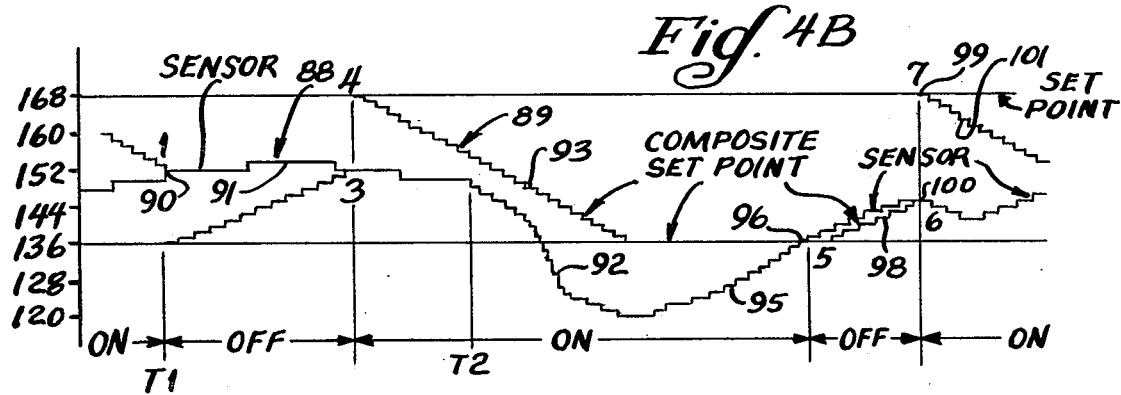
Fig. 5A
Fig. 5B

ELECTRONIC THERMOSTAT WITH HEAT ANTICIPATION AND CONTROL METHOD INCORPORATING SAME

BACKGROUND AND SUMMARY

The present invention relates to a thermostat; and more particularly, it relates to a thermostat which includes heat anticipation.

It is well known that if a conventional room thermostat with a bimetal actuator were to open its contacts only when the mechanical setting (i.e., the temperature at which the thermostat is set) is reached, the actual temperature of the room would rise well above the mechanical setting and even cause the room to become uncomfortably warm. The reason for this is that when the room temperature reaches the mechanical setting, there is still considerable heat stored in the furnace and duct work, and the blower will continue to deliver this heat to the room after the fuel is shut off. The problem of room temperature overshoot would be even further accentuated because of thermal delays between the ambient temperature of the room being heated and the temperature-sensing element in the thermostat. In other words, the actual temperature-sensing element would reach the mechanical setting long after the temperature of the room reached the mechanical setting. Thus, this delay would cause the room temperature to overshoot even further than that which would be caused only by heat storage in the heating system.

This problem is obviated in a conventional thermostat by incorporating a small heater (called the "heat anticipation resistor") adjacent the bimetallic element which generates heat inside the thermostat casing which is conducted directly to the bimetallic element, causing it to switch at the mechanical setting sooner than it otherwise would have switched.

The maximum heat rise of the sensor element due to anticipation heat alone is referred to as the "droop". It is normally of the order of 4° to 5° F. That is to say, if room temperature is at 70° F. and the heat anticipation resistor is continuously energized, but the furnace is not turned on, the temperature of the sensing element will rise approximately four degrees.

The sensing element normally opens at a slightly higher temperature (upper trip point) than the temperature at which it closes (lower trip point). The two trip points thus define a hysteresis effect. The trip points vary with the mechanical setting of the thermostat.

In a conventional thermostat of this type, with the room temperature equal to the mechanical setting, the trip points are equidistant from the limits of the droop range and the thermostat will have a duty cycle of approximately fifty percent. That is, the contacts will be closed fifty percent of the time and open fifty percent of the time (assuming no change in room temperature). Further, the thermostat will go through a complete cycle four to six times per hour.

A small change in the room temperature will change the duty cycle of the thermostat contacts over a wide range. That is, for a small decrease in room temperature, the "on" time (when the thermostat contacts are closed) will increase. If the room temperature changes more than one-half of the droop, the thermostat locks on. That is, anticipation heat alone will not cause the contacts to open, the room temperature must also increase.

It would be desirable to have a thermostat with a solid state sensor element as the temperature sensor, doing away with the bimetallic element of current mechanical thermostats. In addition to the low cost and reliability of solid state circuit elements, such a thermostat could be used in controlling the heating or cooling of individual rooms or spaces in a large building as a function of the time of day. For example, set points could be stored in a microprocessor, and changed at different times of the day, taking into account the position of the sun or other environmental factors. However, a simple on/off type of electrical sensor would not have the desirable characteristics of a mechanical thermostat equipped with heat anticipation, as described above. The embodiments of the present invention are suitable for such systems as well as for direct replacement of conventional mechanical thermostats.

According to the present invention, a solid state temperature sensing element generates a signal representative of the temperature of the room. A second signal, called a set point signal, is representative of a desired temperature setting for that room. The two signals in digital form, are fed into a data processor, in the form of a microprocessor.

In the operation of one embodiment, when the temperature signal rises above the set point, the set point signal is instantaneously decremented to a lower fixed value which is referred to as the lower limit of a set point range and then periodically increased by fixed increments over a period of time until it eventually becomes greater than the temperature signal. When this occurs, the set point signal is instantaneously increased to a higher fixed value which, in the illustrated embodiment, corresponds to the upper limit of the set point range, and thereafter decreased periodically by fixed increments over a longer period of time. Thus, the temperature signal is compared with a composite signal which varies in time under control of the processor.

The duty cycle (which is defined as the portion of a cycle in which the control system generates an "ON" signal) depends upon the average temperature signal in relation to the midpoint of the predetermined set point range of the system for a given set point value. If the average temperature is below the set point, the "on" time of the cycle increases, whereas if the average temperature rises above the set point, the "on" time of each cycle decreases. If the temperature signal is above or below the set point range, the controller will accordingly be continuously turned "OFF" or "ON" respectively for as long as the condition persists.

In an alternative embodiment, the set point signal remains fixed (but adjustable) and the temperature signal is modified by the central processor to form a composite sensor signal which is incrementally increased to an upper fixed value (which may correspond to the upper limit of what is, in this embodiment, referred to as the composite sensor signal range) when it becomes greater than the fixed set point signal and thereafter periodically decreased by smaller increments. Correspondingly, when the composite sensor signal falls below the fixed set point signal, it is decreased to a lower fixed value (which may correspond with the lower limit of the composite sensor signal range) instantaneously and thereafter periodically increased by smaller increments.

The present invention thus provides an electronic thermostat capable of using solid state temperature sensors and which exhibits the desirable heat anticipation features of present mechanical thermostats, yet which is suitable for use with a time-of-day programmer.

Other features and advantages of the present invention will be apparent to persons skilled in the art from the following detailed description of a preferred embodiment accompanied by the attached drawing wherein identical reference numerals will refer to like parts in the various views.

THE DRAWING

FIGS. 4A and 4B are more realistic voltage waveforms illustrating the operation of the first embodiment of the system of FIG. 2;

FIGS. 5A and 5B are voltage waveforms illustrating the operation of a second embodiment of FIG. 2;

Charts I-IV comprise a program listing for the Central Processor Unit.

DETAILED DESCRIPTION

Figure 1A:
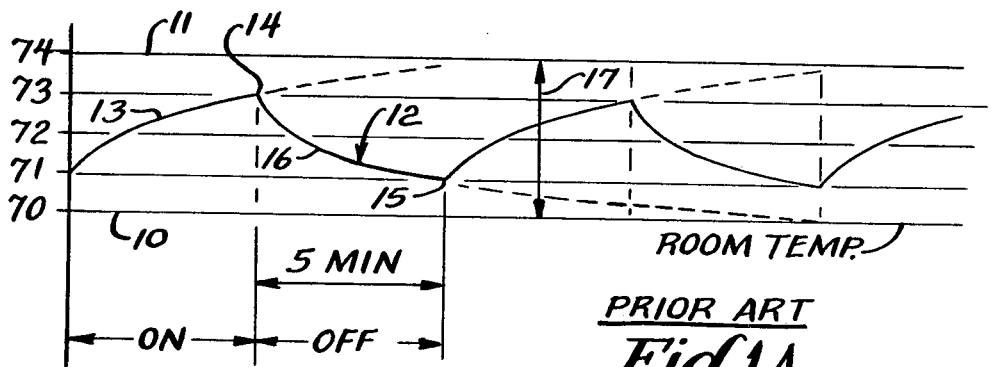
FIGS. 1A and 1B are graphs illustrating the heat anticipation function of a conventional thermostat with a bimetal actuator.
Figure 1B:
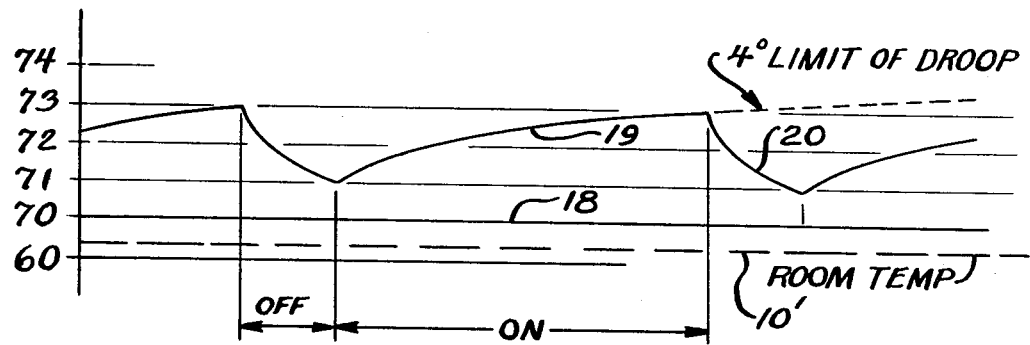

Referring first to FIGS. 1A and 1B, the operation of a conventional thermostat having a bimetallic element and employing heat anticipation will be described. The abscissa of the graphs is time, and the ordinate is temperature. All references to temperature herein will be in degrees Fahrenheit.

In FIG. 1A, reference numeral 10 represents a room temperature of 70°, and it also represents the lower limit of a droop range. The upper limit of the droop range is 74°, indicated by horizontal line 11. In a mechanical thermostat of this type, the lower limit of the droop range is determined by room temperature, and the upper limit is room temperature plus the maximum temperature rise of the bimetal actuator which can be caused by heat anticipation alone. The difference between the upper and lower limits (4° in this illustration) is indicated by the arrow 17, and this difference remains substantially constant even though the room temperature may vary. Reference numeral 12 in FIG. 1A represents the temperature of a bimetal sensing element provided with a heat anticipation resistor.

Assuming that the room temperature remains constant (i.e. the furnace or heat controller is not switched on to add heat to the room), the lower and upper trip points of the thermostat are designated 14 and 15. They are set at 71° and 73° respectively. The contacts of the thermostat open at the upper trip point and remain open for all temperatures higher than the upper trip point. They close at the lower trip point and remain closed for all temperatures below the lower trip point. The temperature differential between the two trip points gives rise to a hysteresis effect in actuating the contacts. The trip points are defined by the mechanical setting of the thermostat which, in the case of FIG. 1A is at the line 10—that is, the setting is 70° F. The differential between the upper trip point 14 and lower trip point 15 is 2° in this example, and this differential remains substantially constant even though the mechanical setting may be changed.

During the rising portion of the curve, indicated by the segment 13, the contacts are closed, thereby energizing the heat anticipation resistor, and causing the temperature of the sensing element to increase according to the curve segment 13. Ordinarily, of course, the closing of the thermostat contacts would cause a controller to feed fuel to the furnace, but not for this illustration. When the temperature of the sensing element increases to 73° F., as indicated at the upper trip point 14, the contacts open, thereby removing power from the heat anticipation resistor, (and ordinarily shutting off fuel from the furnace), and causing the temperature of the sensing element to reduce according to the curve segment 16 toward room temperature until it reaches the lower trip point 15, at which time the contacts close again.

The temperature of the sensing element thus cycles periodically having a fifty percent duty cycle (that is, the time during which the ON signal is being generated). The overall cycle time is ten minutes so that the thermostat undergoes six complete cycles per hour. It will be observed from the above that the temperature differential between the upper and lower switching points is two degrees, and this is one-half the droop range. Thus, the temperature differential between the trip points comprises a substantial portion of the droop range, leaving only one degree between the upper trip point and the upper limit of the droop range, and one degree between the lower trip point 15 and the lower limit of the droop range. Thus, the room temperature can vary from the mechanical setting of the thermostat only ± one degree before one trip point falls outside the droop range. If the upper trip point 14 is greater than the upper limit of the droop range, the thermostat locks ON, and conversely, if the lower trip point 15 is less than the lower limit of the droop range, the thermostat locks OFF. It will be appreciated after the present invention is fully disclosed that the room temperature can vary a full one-half of the droop before a switch point falls outside that range.

Referring now to FIG. 1B, if the room temperature (illustrated by dashed line 10') decreases slightly below the mechanical setting (represented by the solid line 18), even less than one degree, it can be seen that the duty cycle increases dramatically, as indicated by the ON portion of the cycle, during which the temperature of the sensing element is rising along the curve segment 19. During the OFF portion of the cycle, the temperature of the sensing element decreases along the curve segment 20. The trip points remain the same as long as the mechanical setting of the thermostat is not changed.

In this example, the maximum temperature rise that can be effected by the heat anticipation resistor is 4° F. Thus, if the room temperature were to fall below 69° F., the thermostat would remain on continuously since the temperature of the sensing element would never be able to reach the upper trip point set at 73° F. In the example of FIG. 1B, the droop range has remained the same (4° F.), and the thermal time constants for the rise and fall of the temperature of the sensing element are also unchanged.

Figure 2:
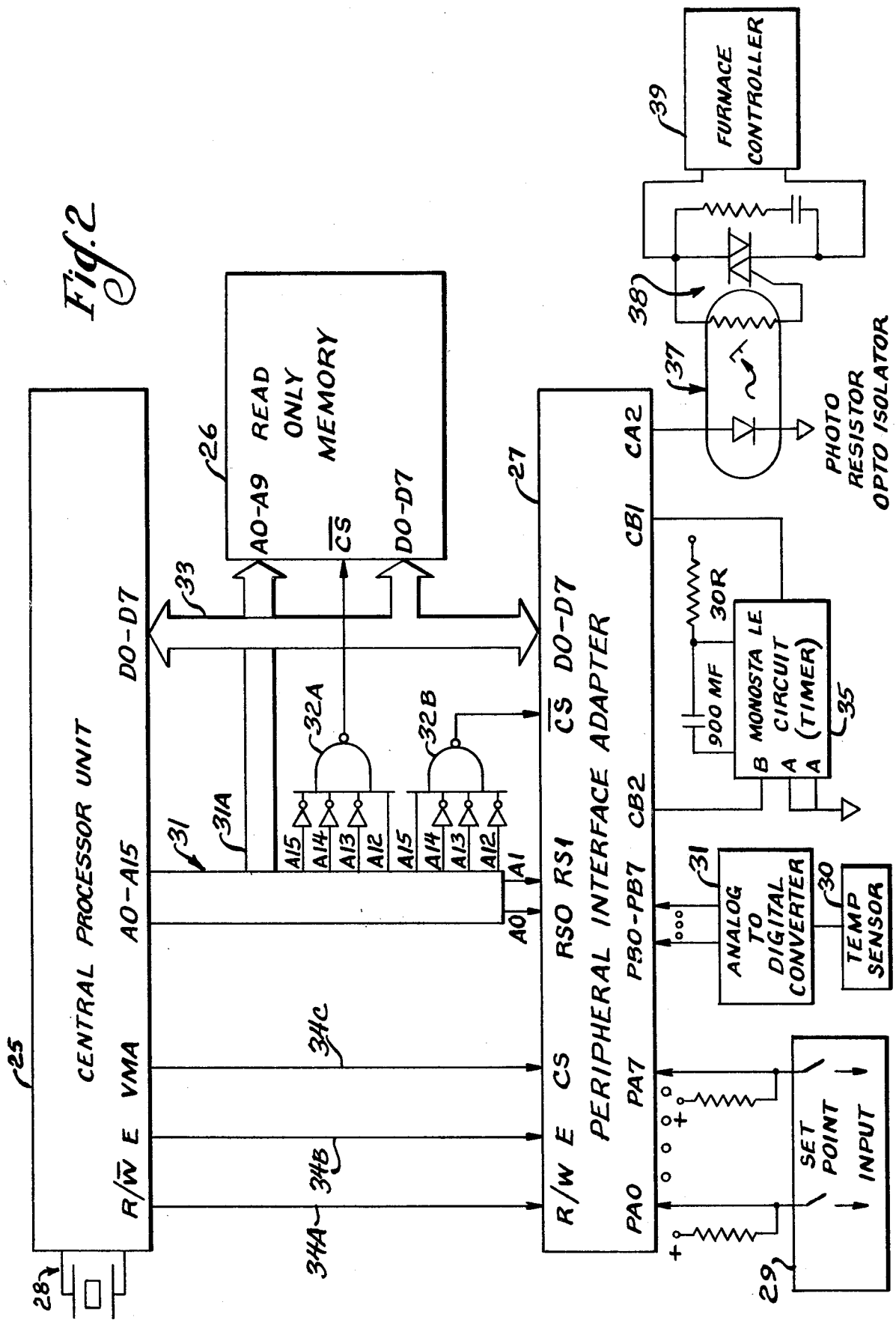
FIG. 2 is a functional block diagram of a digital electronic thermostat incorporating the present invention.

Referring now to FIG. 2, there is shown data processing apparatus for practicing the present invention including a Central Processor Unit 25 (CPU), a Read Only Memory 26 (ROM), and a Peripheral Interface Adapter 27 (PIA). Each of the circuit elements disclosed herein is commercially available and formed on a separate substrate, so they are referred to as "chips". The CPU and PIA circuits may be obtained from Motorola Semiconductors of Austin, Texas under the designations MC 6802 and MC 6821 respectively. The CPU includes a microprocessor, registers, accumulators, drivers, an internal clock oscillator (designated 28 in FIG. 2) and 128 bytes of Random Access Memory. The ROM 26 may be a 2708 UV-erasable ROM manufactured by Intel.

The set point data is fed into the system through functional block 29 which generates an eight-bit digital word representative of a desired temperature (i.e. set point). This function generator is diagrammatically illustrated, as a set of eight switches, the outputs of which are fed in parallel to eight data inputs PA0-PA7 of the PIA 27, any suitable adjustable means such as a rotary dial switch may be employed for generating the set point signal. Similarly, an analog signal from a temperature sensor 30 (which may comprise a solid state sensor) is fed to an analog-to-digital converter 31 which converts the analog signal representative of temperature to an eight-bit parallel digital representation which is fed to data inputs PB0-PB7 of the PIA 27.

An address bus generally designated 31 communicates the CPU 25 with the ROM 26 and the PIA 27. The address bus 31 comprises a sixteen-bit bus, the first ten bits of which (A0-A9), form a segment 31A for addressing the ROM 26. Bits A0 and A1 are also fed to inputs RS0 and RS1 of the PIA 27 to select a particular register in the PIA for reading or writing. Bits 12-15 are also coupled to first and second NAND gates 32A and 32B for selecting the ROM chip 26 and the PIA chip 27 (in combination with the Valid Memory Address Output of the CPU on line 34C).

Lines 34A and 34B connect the CPU 25 with the PIA 27 for Read/Write selection and enable for controlling data transfers over a bidirectional data bus 33 which communicates data between the CPU and ROM, and the CPU and PIA. The signals on the register and chip select lines should be stable for the duration of the E pulse on the enable line 34B. The E pulse and the R/W signal on line 34A control data transfers.

A monostable circuit 35 (which may be a 74121 monostable available through National Semiconductor) is triggered by a signal on control output CB1 of the PIA 27, and the output of the monostable circuit 35 is fed back to the CPU via input CB2 of the PIA. This circuit determines the basic cycle time of the system (the number of cycles per hour in the examples of FIGS. 4A and 5A), and it provides a delay of approximately 18.75 seconds (block 128 of the flow chart of FIG. 6), as will be described.

An output of PIA 27 is taken from control output CA2 and fed through a photocoupler isolator generally designated 37 to actuate a triac 38, the output of which is coupled to a furnace controller 39 for turning a furnace on or off under control of the CPU 25.

Figure 2A:
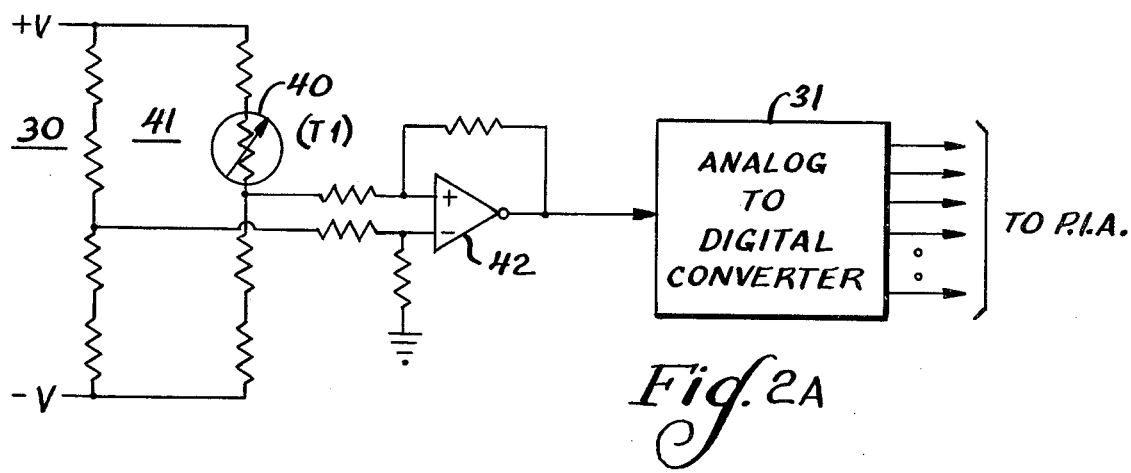
FIG. 2A is a circuit schematic diagram illustrating the generation of temperature signals to the computer.

A temperature sensor circuit is seen in FIG. 2A. A temperature sensor 40, which may be a semiconductor sensor having a negative temperature coefficient, is connected in a bridge circuit generally designated 41. The output of the bridge circuit is an analog voltage having a magnitude representative of the temperature of the sensor 40; and this signal is coupled to a differential amplifier 42 which feeds the input of the analog-to-digital converter 31. The outputs of the analog-to-digital converter are coupled to ports PB0-PB7 of the PIA 27 of FIG. 2. Other circuit arrangements will be apparent to persons skilled in the art for generating digital signals representative of temperature in a space being controlled.

Figure 3A:
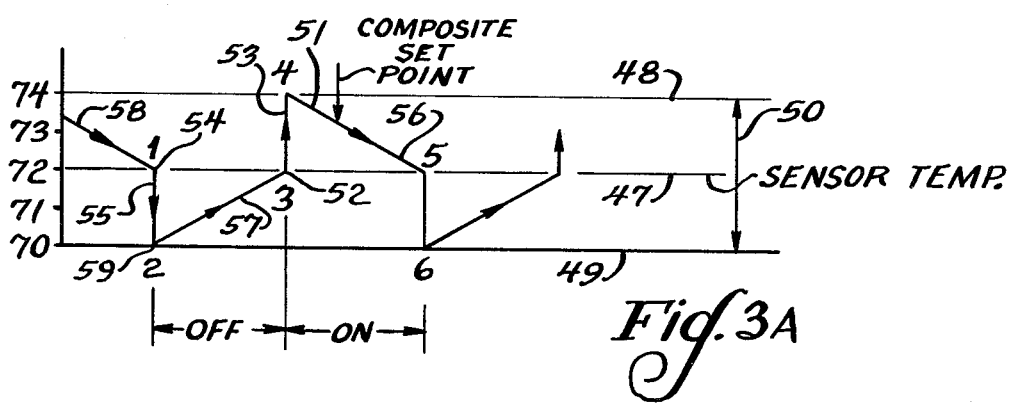
FIGS. 3A-3C are idealized voltage waveforms illustrating the operation of one embodiment for the system of FIG. 2.

Referring now to FIG. 3A, the overall operation of one embodiment of the invention will be described. In FIG. 3A the abscissa is time, and the ordinate is temperature in °F. The concepts defined above in connection with a conventional mechanical thermostat with a bimetallic actuator do not have direct correspondence or analogies in this description. In the digital embodiment, the set point input signal from the block 29 of FIG. 2 is a constant, although it may be adjusted. It is represented in FIG. 3A by the horizontal line 47 (corresponding to 72° F.). In this illustration, the temperature of the sensor 30 of FIG. 2 is also at 72° (coinciding with the line 47). A set point range is centered about the fixed set point signal, and it includes an upper limit 48 and a lower limit 49. These limits correspond with 74° and 70° respectively. The set point range is thus represented by the arrow 50.

A composite set point signal is generally represented by the curve 51. One component of the composite set point signal is the value of the fixed set point signal 47. Another component is a step function, sometimes referred to as the reinforcing or offset signal. In the case where an increasing composite set point signal becomes equal to the temperature signal (see the point 52 in FIG. 3A), it is desired to turn the furnace ON, and in this case, the offset signal is a positive step function indicated by the vertical line 53. In the case where a decreasing composite set point signal becomes equal to the temperature signal, as at point 54, the offset signal is a negative step function as indicated by the vertical portion 55 of the composite set point signal. In this case, it is desired that the furnace be turned off. It is the composite set point signal that varies in FIG. 3A so it becomes equal to the temperature signal. However, it may be easier to understand the state of the output signal if the temperature signal is thought of as being greater than or less than the composite set point signal.

The composite set point signal includes a third component which varies with time. In the case where a positive offset signal has been added, as at 53, then the time-varying or "ramp" signal, as it is called, has a predetermined negative slope, as indicated by the portion 56. In the case where a negative offset signal has been added to the composite set point signal, as at 55, then the ramp signal has a positive slope, see the portion 58 in FIG. 3A.

In the illustrative example of FIG. 3A, the temperature signal remains fixed at 72° throughout. That is, no heat is added to the room even though the signal generates an ON output signal. To summarize the operation illustrated in FIG. 3A, the value of the composite set point signal decreases along the portion 57 until it reaches the point 54. During this period, the system of FIG. 2 will generate an ON output signal by causing the triac 38 to conduct, as will be made clear from subsequent description. When the composite set point signal becomes less than the temperature signal at the point 54, the composite set point signal is abruptly changed along the portion 55 to the value indicated at 59.

The amount of the decrease of the composite set point signal due to the offset signal will be described in more detail in connection with the flow chart of FIG. 6. Briefly, however, for purposes of understanding the overall system operation, it may be thought of as an amount sufficient to bring the composite set point signal to the lower limit 49 of a set point range 50—namely, the point 59. Thereafter, a positive ramp signal is added to the composite set point signal, as indicated by the sloped portion 57. During this period, because the composite set point signal is less than the temperature signal, the system generates an OFF output signal.

When the composite set point signal exceeds the temperature signal as indicated by the point 52, an offset signal as indicated by the step function 53 is added, making the composite set point signal equal to the upper limit 48 of the set point range. At this time, the system generates an ON output signal because the temperature signal is less than the positive set point signal. Thereafter, the negative ramp 56 is added to the composite set point signal, and the system thus cycles, repeating the operation just described.

It will be observed that the duty cycle in the example of FIG. 3A is fifty percent. This is desirable where the temperature is equal to the fixed set point signal, as indicated by the line 47. The slopes of the ramp portions 57, 56 define the period of a basic operating cycle, and this is set so that the system will go through six complete cycles in an hour in the case where no heat is added to the room. This is a standard convention used in the industry. It may also be thought of as describing system operation in the case where room temperature change is negligible because of extremely long time constants.

Figure 3B:
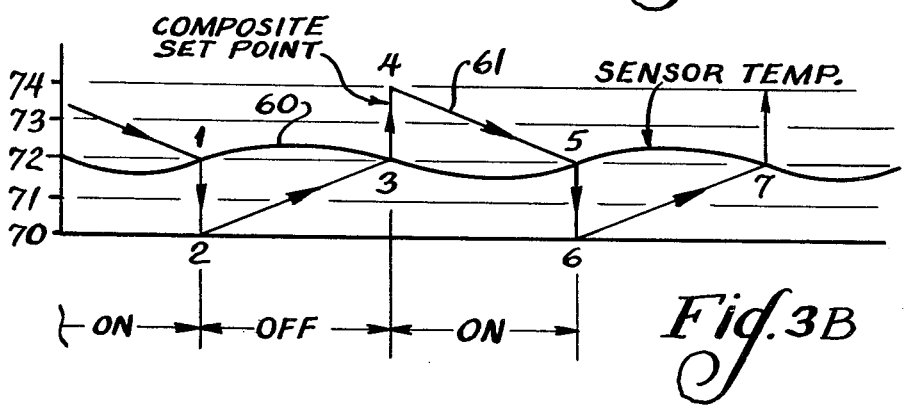

Referring now to FIG. 3B, a more realistic curve for sensor temperature is generally designated 60; and the composite set point signal is designated 61. In this case, the fixed set point setting (72°) is also equal to the average temperature; but in this case, there is a steady heat loss from the room so that each time the system generates an ON signal, a furnace is started. It will be observed that the temperature curve 60 lags the composite set point signal, as would normally be expected. That is to say, even though the system generates an OFF signal to shut off the fuel to the furnace, the temperature of the system nevertheless continues to rise due to latent heat in the duct work and feed system. The composite set point signal in the example of FIG. 3B is generated in the same method as that for FIG. 3A, according to the conditions described above.

Figure 3C:
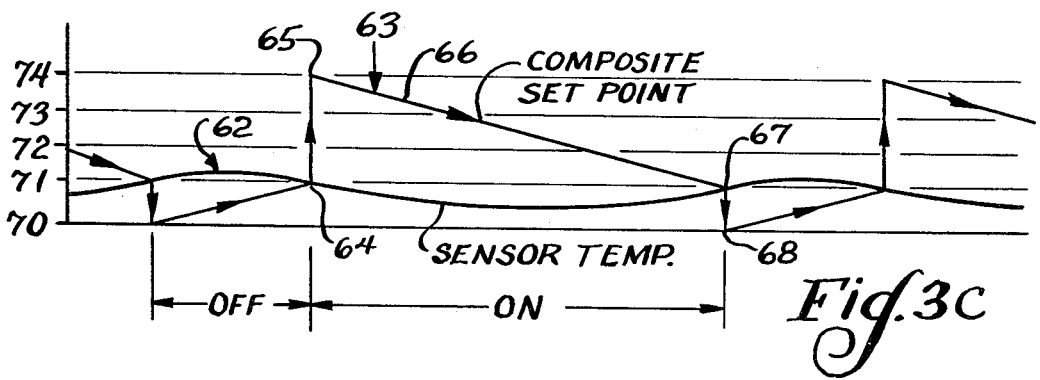

Referring now to the example of FIG. 3C, the temperature signal is generally designated 62, and the composite set point signal is designated 63. Again, the set point is set at 72°. In this case, the average value of the temperature signal is less than the fixed set point signal; and the system generates an ON signal which is much longer than its OFF signal. That is, the duty cycle has increased, as is desired. Again, the generation of the composite set point signal follows the method described above. That is, if the set point signal is less than the temperature signal and equality is reached (for example, at the point 64), then the composite set point signal is forced to a value at 65 which is equal to the upper limit of the set point range, in this case, 74° F. Thereafter, the composite set point signal is decreased according to a fixed slope, as indicated by the portion 66, until it reaches a point 67 of equality with the temperature curve 62. At this time, the composite set point signal is forced to the lower limit of the set point range, namely the point 68 in FIG. 3A.

Referring now to FIGS. 4A and 4B, a more realistic operation is described. In these examples, a temperature range from 53° to 85° F. (a total range of 32°) is divided into $2^8$ (256) increments, corresponding to divisions of the temperature range. In other words, each increment corresponds to $\frac{1}{8}$ of a degree. The zero level or count corresponds to 53° F. and the 256th count corresponds to 85° F. The 136th count would correspond to 70° (refer to FIG. 4B) and the 168th count to 74°.

Figure 6:
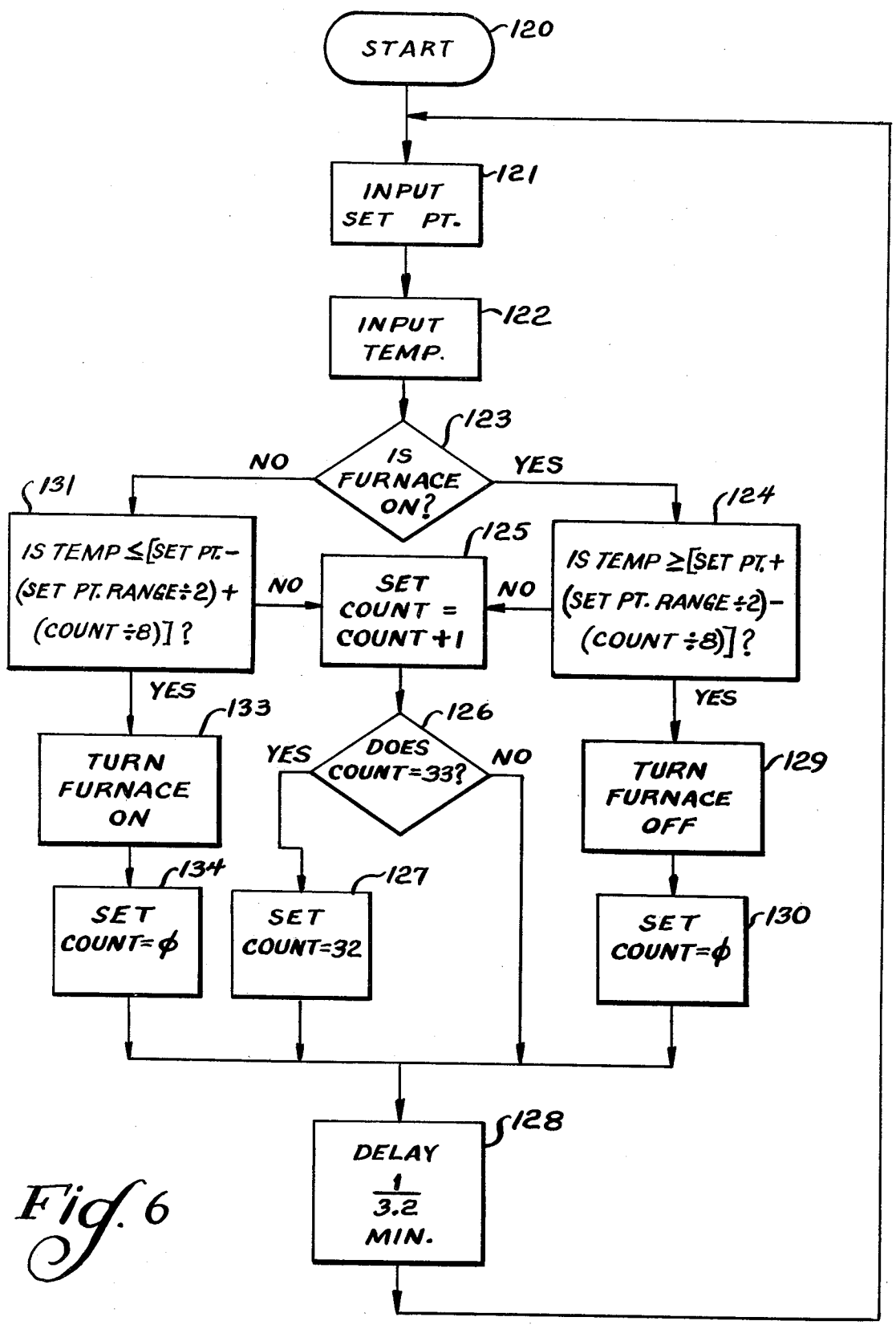
FIG. 6 is a flow chart illustrating the operation of the system of FIG. 2 according to the example of FIGS. 4A and 4B.

A composite set point function generally designated 68 in FIG. 4A is generated internally by the Central Processor Unit 25 of FIG. 2, following the flow chart of FIG. 6. In the example of FIG. 4A, the set point and the temperature signal are fixed at 72° (count 152) as represented by the horizontal line 69. The set point range is 4° F. (corresponding to 32 increments or steps in the division mentioned above). The lower level of the set point range is indicated by line 70, and the upper level of the set point range by the line 71.

The composite set point function is generated according to the flow chart of FIG. 6. Turning then to FIG. 6, the routine is entered at the START block 120, and in block 121, the CPU 25 retrieves the set point setting from the set point input circuit 29 (FIG. 6) via PIA 27 and data bus 33. In block 122, the CPU 25 retrieves the temperature signal from the analog-to-digital converter 31 in a similar manner. Next, in decision block 123, the program determines whether the furnace is on.

If the furnace is on, the program proceeds to block 124 to determine whether the temperature is greater than or equal to the composite set point signal which comprises the fixed set point setting (72°) plus one-half the set point range minus the number of "counts" times $\frac{1}{8}$. The counts are stored in an internal register in the CPU which is incremented, as will be described, in block 125 each time the program decides that there is to be no change in the output state. The count is limited to a maximum of 32. Each count may be considered to correspond to an increment of $\frac{1}{8}$ of a degree, as discussed above. Hence, the count limit of 32 corresponds to the set point range (32 counts $\times \frac{1}{8}$° per count=4°).

Returning to the flow chart of FIG. 6, if the temperature or sensor signal is not greater than or equal to the composite sensor signal in block 124, the program proceeds to block 125 where it increments the stored count by 1 and then proceeds to block 126 to determine whether the total count equals 33. If it does, the count is limited to 32 in block 127; and a program delay is executed in block 128, determined by the period of the timer 35 (approximately 1/3.2 min. or 18.75 sec.). The system then recycles to input the set point signal in block 121. This limits the value of the composite set point signal to the lower limit of the set point range, and locks the system ON when the temperature is lower than the lower limit of the set point range until the temperature rises above the point.

If, in block 124 it had been determined that the temperature signal is greater than the composite set point signal, the system generates an OFF signal in block 129, and resets the count to zero in block 130. Following that, a program delay is executed and the program loops back to block 121.

If in decision block 123 it had been determined that the furnace was OFF, the program proceeds to decision block 131 in which it determines whether the temperature signal is less than or equal to the composite set point signal. If this determination is "No", the program proceeds to block 125 to increment the count, and the subsequent program path following block 125 has already been described. If it is determined that the temperature signal is less than the composite set point signal, the system generates an ON signal in block 133, resets the count to zero in block 134, and executes a program delay in block 128. It will thus be observed from decision blocks 124, 131 discussed above, that one way to define the composite set point signal is first to determine whether the system is generating an ON signal or an OFF signal. If it is generating an ON signal, then the composite set point signal is equal to the fixed set point signal plus one-half the value of the set point range minus ⅛ the number of counts stored in the count register. Thus, it is comprised of a fixed signal, a step function or large incremental signal, and a time varying signal since the number of counts stored in the count register is a function of time.

Similarly, if the furnace is off, then the composite set point signal is equal to the fixed set point value less one-half the set point range plus ⅛ times the number of counts stored in the count register. It will be observed that this description for the composite set point signal holds true for the examples discussed above in connection with FIGS. 3A–3C.

Returning now to the example of FIG. 4A, during the first portion of a cycle shown, the furnace is on, and the composite set point signal 68 is being decremented by ⅛ of a degree every 18.75 sec. When the composite set point signal becomes less than the temperature signal as indicated by the point 73 it corresponds to a "Yes" to decision block 124 of FIG. 6. Thus, the furnace is turned off, and during the next move, the program proceeds from block 123 to block 131, and the composite set point function has been changed to the point 72. Thereafter, the composite set point signal is incremented along the portion 74, which has an average slope determined by the amount of the increment and the program delay of block 128 of FIG. 6. Another way to look at the composite set point signal is as described in connection with the examples of FIGS. 3A–3C, namely, that when the composite set point signal becomes less than the temperature signal, the furnace is turned off and the composite set point signal is made equal to a lower, fixed value (in this case, the lower limit of the set point range corresponding to 70°). Thereafter, the composite set point signal is incremented by the ramp-like signal. The step function signal causes an offset to the composite set point signal which tends to reinforce the state to which it has switched, whereas the slope of the ramp signal tends to change the state of the output controller, and it is this combination which causes the system to achieve the desired cycling characteristic.

To summarize the example illustrated in FIG. 4A according to the flow chart of FIG. 6, the composite set point function 68 may be separated into three components: (a) a steady state or fixed value representing a set point setting (which may be programmed or changed by the computer to achieve time-of-day programming); (b) step function (offset signal) combined with which is the steady state value having a magnitude sufficient to cause the combined signal to equal either the upper limit 71 or the lower limit 70 of the set point range (depending on whether the system has just turned ON or OFF respectively) and having a polarity which reinforces the state to which the system has just switched; and (c) a periodic incrementing or decrementing function (digital ramp) having a slope polarity tending to cause the system to switch states. For example, referring to the switch at point 73, the steady state value is a fixed value equal to the 152nd count (in this example, it is the same as the temperature signal). The offset signal is a step function which, after the system has switched from ON to OFF, causes the set point function to be equal to the lower limit 70 of the set point range. This is indicated in block 131. When the furnace has just been switched off, the "count" is zero, so the composite set point function is the set point value less one-half the set point range. In general, once the system switches from ON to OFF, the offset signal insures that the composite set point function will be set to the upper or lower limit of the set point range, depending on whether the furnace is being turned on or off respectively. The third component (namely, the digital ramp function which causes the set point function to increase along the portion 74), has a slope of a polarity tending to cause the system to switch from the OFF state back to the ON state. The average value of the slope of the portion 74 determines the cycle time for the system. In general, the slope of the digital ramp has a polarity tending to cause the system to change output states.

Similarly, when the system does switch to ON at point 75 of FIG. 4A, the offset signal causes the composite set point function to be equal to the upper limit 71 of the droop range, and the ramp function decrements the set point value in a sense tending to cause the system to switch back to OFF.

In the example of FIG. 4A, no heat is added to or taken from the space being controlled so that the sensor temperature remains fixed. In FIG. 4B, a more realistic sensor signal from the output of the analog-to-digital converter 31 is indicated by the curve 88 (the value of which, of course, is in analog form in the graph). In this example, the lower and upper limits of the set point range are again designated 70 and 71. The composite set point function is generally designated 89. This example is more realistic because prior to time T1, the system is on, causing the space to be heated. Even though the system turns off at time T1 (when the temperature signal equals the set point function at point 90), the temperature will nevertheless continue to increase as at 91 due to latent heat stored in the duct work which is continued to be delivered to the space.

The system operates as described above; however, at time T2, a cold draft is admitted to the room, causing the temperature to plunge as at 92 to a value below the lower limit 70 of the set range. In this case, the composite set point function is decremented along the portion 93 until it reaches the lower limit 70 of the set point range, and then it remains constant because the count is limited to 32 in block 127 of FIG. 6. The composite set point function cannot go outside the boundaries of the fixed set point range, although these boundaries may be changed as the fixed set point is changed.

In this example, eventually the draft is eliminated and the furnace continues in the ON condition adding heat to the room, and the temperature rises along the portion designated 95. When the temperature exceeds the set point value as at 96, the furnace is turned off but the temperature continues to rise, and the composite set point function is incremented as indicated at 98. When the composite set point function equals the temperature as at 100, it is made equal to the upper limit 71 of the set point range, as at 99, and it is thereafter decremented as indicated by the portion 101. During this time, the system is turned ON.

It will be observed from the example of FIG. 4B that when the temperature falls below the fixed set point, the duty cycle (that is the time during which the system is on) increases substantially. A typical rate for the sloped or ramp portions of the composite set point signal may be 3.2 increments per minute which is set by the period of the timer 35 because the timer determines the program delay of block 128. This changing portion of the signal is sometimes referred to as a ramp because it has an average value which has a constant slope. It need not necessarily have a constant average slope—that is, the size of the increments may change. The program listing for the CPU according to the flow chart of FIG. 6 is given on Charts I–IV. The comments in the program listing refer to block numbers on the flow chart.

Referring now to FIG. 5A, there is shown a graph illustrating the operation of a second embodiment of the invention wherein the abscissa is again time, and the ordinate is the same as described in connection with FIGS. 4A and 4B—namely, a scale of incremental units representing temperature with eight units per degree of temperature and covering an arbitrary range of expected control. In this embodiment, the set point is a constant (but adjustable, of course) as indicated by the horizontal line generally designated 105. In this embodiment, the sensor signal, not the set point signal, is modified. Thus, a composite sensor signal is generally designated 106. Again, this is an idealized example to illustrate the operation of the system, and it is assumed that no heat is added to or taken from the space being controlled. Further, it is the composite sensor signal which is confined within limits. The upper limit is designated 108, and the lower limit is designated 108A. Together, they define a Composite Sensor Signal Range indicated by the arrow 108B. In this embodiment, the Composite Sensor Signal Range of FIG. 5A is equal to the set point range of the examples of FIGS. 4A and 4B. If the composite sensor signal reaches the upper limit 108, with the system on and the set point signal above the range 108B, the system will be locked ON. When the composite sensor signal 106 is greater than the fixed set point value or signal 105, the system generates an OFF signal; and when the composite sensor signal is less than the fixed set point signal, the system generates an ON output signal.

The composite sensor signal comprises three components: (a) the temperature or sensor signal, which in this case is a fixed value (and equal to the set point signal) as represented by the line 105; (b) a step function or offset signal which causes the composite sensor signal to be equal to the upper limit of the composite sensor signal range when the system has switched OFF and to be equal to the lower limit of that range when the system switches ON; and (c) a ramp function (digital) having an average slope which determines the cycle time of the system and having a sense (i.e. slope polarity) tending to cause the output signal to change state.

Referring to the portion 107 of the composite sensor signal 106, when it equals the fixed set point value 105, the composite sensor signal is forced to the upper limit of the range as at 109. Thereafter, the composite sensor signal is periodically decremented by the ramp portion 110 until it equals the fixed sensor value at 111, at which time it is forced to be equal to the lower limit 70 of the range, as indicated at 112. As already indicated, when the composite sensor signal is greater than (or, alternatively, equal to) the fixed set point signal, the system is switched OFF and when it is less than the fixed set point signal, the system is switched ON, as illustrated.

Turning now to FIG. 5B, the fixed set point signal is the same as above, as indicated generally by reference numeral 105, in this example, and the value of the sensor signal increases to the value indicated at 115. The upper and lower limits of the composite sensor signal range are again indicated at 108 and 108A respectively. These values are predetermined according to the value of the sensor signal and shift with it.

It will be observed from FIG. 5B that the sensor signal is greater than the fixed set point and the composite sensor signal is forced to the upper limit 108 of the range, when the system switches off as indicated at 113. The ramp portion 117 continues decrementing the composite sensor signal until it reaches the fixed set point 105, at which time the system switches on. In this idealized example in which, again, no heat is added to or taken from the room, the ON time is diminished, with a corresponding increase in the OFF time of each cycle. If the sensor signal 115 had increased such that the lower limit of the range were above the set point signal 105, the composite sensor signal would have reached the lower limit 108A and remained there, thereby locking the system in the OFF state. Conversely, if any heat were added to the room during the ON time, the sensor signal would increase; and the set point signal would be outside the composite sensor signal range, thereby also locking the system in the OFF state.

Figure 7:
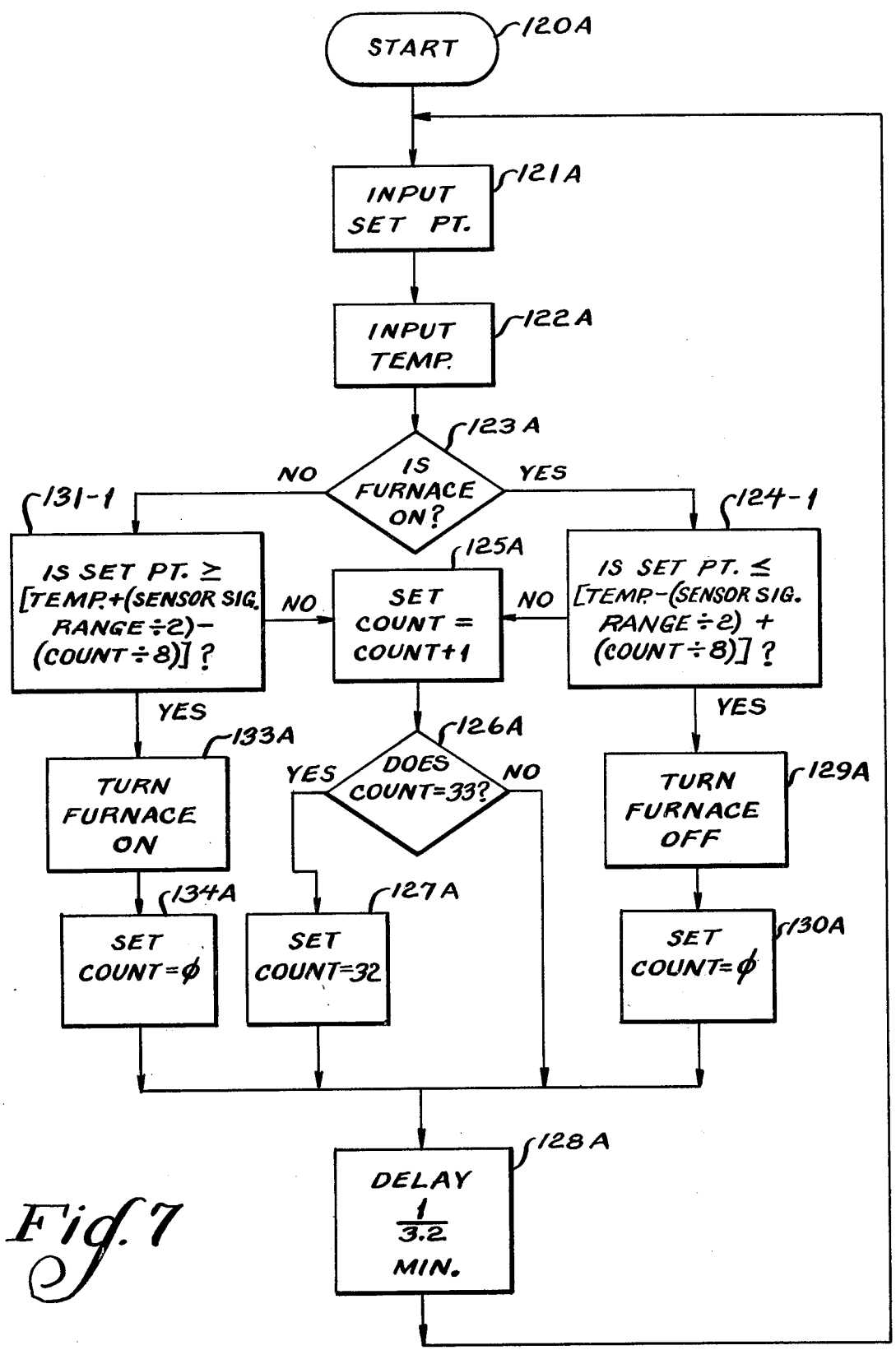
FIG. 7 is a flow chart illustrating the operation of the system of FIG. 2 according to the example of FIGS. 5A and 5B.

FIG. 7 is a flow chart describing the operation of the embodiment just explained and illustrated in FIGS. 5A and 5B. It is similar to that shown in FIG. 6 and already described, so it need not be discussed in detail. Blocks in FIG. 7 which have the same operation are labeled with the same number followed by an "A". The only two differences occur in blocks 124-1 and 131-1 in which the set point is compared with the composite sensor signal. If the furnace is on, the composite sensor signal is equal to the set point minus one-half the sensor signal range less one-eighth the count; and if the furnace is not on, the composite sensor signal is equal to the temperature plus one-half the sensor signal range minus one-eighth the count. Persons skilled in the art will readily be able to compose suitable code listings for these changes if it is desired to practice the second embodiment.

Having thus disclosed in detail preferred embodiments of the invention, persons skilled in the art will be able to modify certain of the steps and structure which have been described and substitute equivalent methods or elements while continuing to practice the principle of the invention. For example, the invention has been disclosed in the context of a heating system, but it could equally well be used for controlling air conditioning, with suitable lengthening of the cycle time (i.e. the delay time of the monostable circuit 35) and inverting the polarity of the output signals. It is, therefore, intended that all such modifications and substitutions be covered as they are embraced within the spirit and scope of the appended claims.

I claim:

1. Thermostat apparatus comprising: sensor circuit means responsive to ambient temperature for generating a digital electrical temperature signal representative of ambient temperature; set point means for generating a digital electrical set point signal representative of a desired temperature set point; data processor means receiving said temperature and set point signals for generating a composite signal from one of said temperature and set point signals comprising a first component signal representative of said one signal, a second offset component signal having a sense to reinforce the state of said output signal, and a third component signal comprising a time-varying signal having a slope opposite to the sense of said offset signal, said data processor means comparing said composite signal with the other of said set point and temperature signals for generating an output control signal when said composite signal reaches a predetermined value relative to said other signal; and control circuit means responsive to said output control signal for controlling a source of energy.

2. The apparatus of claim 1 wherein said output control signal comprises ON and OFF signals for actuating and de-actuating said control circuit means respectively, and wherein said composite signal is a composite set point function, and wherein said data processor means includes storage means for storing data representative of an upper and a lower fixed value above and below said fixed set point signal respectively, said data processor means generating said second component set point function such that said composite set point function is equal to one of said upper and lower fixed values when said apparatus switches to one of said output signals, and said composite set point function is equal to the other value when said apparatus generates said other output signal.

3. The apparatus of claim 2 wherein said upper and lower fixed values define the upper and lower limits of a set point range relative to said fixed set point, said data processor means limiting said composite set point function to values within said range.

4. The apparatus of claim 2 wherein said set point means comprises adjustable means for generating said set point signal, and said data processor means selectively reads and stores the output signal of said set point means.

5. The apparatus of claim 3 characterized in that said upper and lower limits of said set point are approximately 2° F. above and below said set point value respectively and that said ramp function has an average slope of approximately 0.4° F. per minute.

6. The apparatus of claim 2 wherein said temperature sensor means includes a solid state element having a resistance which varies with temperature.

7. The apparatus of claim 1 wherein said data processor means generates said offset component and combines it with said set point signal when said output signal changes state.

8. The apparatus of claim 1 wherein said output control signal comprises a binary signal having first and second states for actuating and de-actuating said control circuit means respectively, and wherein said composite signal is a composite sensor function including upper and lower limits above and below the sensor signal and defining a composite sensor range, said data processor means combining said offset signal with said composite sensor function such that said composite sensor function is equal to said upper limit of said composite sensor range when said system switches to generate one of said states of said output control signal, and said composite sensor function is equal to said lower limit when said system switches to generate the other of said states of said output control signal.

9. The apparatus of claim 8 characterized in that said upper and lower limits of said composite sensor range are approximately 2° F. above and below said temperature signal respectively.

10. The apparatus of claim 1 wherein said third component signal is a digital ramp signal having a constant average slope and comprised of incremental charges of constant magnitude and equal period.

11. Electronic thermostat apparatus for controlling a source of energy with an output control signal having first and second states for actuating and de-actuating a controller respectively, comprising: sensor circuit means responsive to ambient temperature for generating an electrical signal representative of temperature; set point signal means for generating an electrical signal representation of a desired set point; data processor means receiving said temperature signal for generating a composite set point function signal and for comparing the same with said temperature signal, said composite set point function including a first component representative of a desired set point, a second component including a step function, and having a sense reinforcing said output signal, and a third component comprising a time-varying signal having a slope opposite to the sense of said second component, said data processor means comparing said composite set point function signal with said temperature signal for generating one state of said output control signal when the composite set point function is less than the temperature signal and for generating the other state of said output control signal when the composite set point function is greater than said temperature signal.

12. The apparatus of claim 11 wherein said data processor means includes programmed means for generating data representative of an upper limit level and a lower limit level relative to said set point signal to define a set point range, said data processor means being programmed to cause said composite set point function to increase to one of said limit levels of said set point range when an increasing composite set point function bears a predetermined relation to said temperature signal, said processor means being further programmed to cause said composite set point function to be equal to the other limit level of said set point range when a decreasing composite set point function bears a predetermined relation to said temperature signal.

13. The apparatus of claim 12 further comprising output circuit means responsive to said data processor means for generating said first output state of said output control signal when said composite set point function is greater than said temperature signal and for generating the complement of said output control signal when said composite set point function is less than said temperature signal.

14. The apparatus of claim 13 wherein said data processor means generates said second offset component signal and combines it with said composite set point signal when said output control signal changes state.

15. The apparatus of claim 14 wherein said time varying signal is a ramp having an average slope of approximately 0.4° F. per minute.

16. Electronic thermostat apparatus for generating complementary output control signals for actuating and de-actuating a controller respectively comprising: sensor circuit means responsive to ambient temperature for generating a temperature signal representative of temperature; set point signal means for generating a set point signal representation of a desired set point; data processor circuit means receiving said temperature signal for generating a composite sensor function signal and for comparing the same with said set point signal, said composite sensor function signal including a first component representative of ambient temperature, a second component comprising a step function, and a third component comprising a time-varying signal having a slope opposite to the sense of said step function, said data processor means comparing said composite sensor function signal with said set point signal for generating a first output control signal when the set point signal bears a predetermined relationship with said composite temperature function and for generating the complementary output control signal when the composite sensor function bears a predetermined relationship with said set point signal; and output circuit means responsive to said output control signal for controlling said controller.

17. A method of controlling the temperature of a zone by a bivary output control signal to a controller comprising: establishing an upper and a lower limit defining a range for a given temperature set point signal; generating a temperature signal representative of the temperature of said zone; generating a composite set point function signal comprising a first component representative of a desired set point for said zone, a second component representative of an increase or decrease of said composite signal to the upper or lower limit of said range when said output control signal is in one or the other of its complementary states respectively, and a third time-varying component having a slope tending to overcome said second component; comparing said composite signal with said temperature signal; generating said one state of said output control signal to said controller when said composite step point signal bears a first predetermined relationship with said temperature signal; and generating the other state of said control signal to said controller when said composite set point signal bears a different predetermined relationship with said temperature signal, said second component forcing said composite set point signal to said upper limit of said range when said output control signal is switched from said other state to said one state, and forcing said composite set point signal to said lower limit of said range when said output control signal is switched from said one state to said other state, said third component having a tendency to cycle said controller but being limited by said limits.

18. The method of claim 17 wherein said step of comparing comprises detecting equality between an increasing composite set point signal and said temperature for increasing said composite set point signal to the upper level of said range when said composite set point signal reaches a predetermined value relative to said sensor signal, and thereafter decreasing said composite set point signal according to the slope of said time-varying signal; and detecting when said decreasing composite set point signal is equal to a predetermined value relative to said temperature signal and then decreasing said composite set point signal to a value equal to the lower limit of said range and thereafter increasing said composite set point signal accordingly to the slope of said time-varying signal.

19. The method of claim 17 further comprising the steps of limiting said composite set point signal to value within said range and causing the same to remain equal to one of said limits if said limit is reached before the associated relationship is detected, and until such relationship is detected.

20. The method of claim 19 wherein said slope equals approximately 0.4° F. per minute.

* * * * *

UNITED STATES PATENT AND TRADEMARK OFFICE
CERTIFICATE OF CORRECTION

PATENT NO. : 4,270,693
DATED : June 2, 1981
INVENTOR(S) : Thomas Edward Hayes

It is certified that error appears in the above—identified patent and that said Letters Patent is hereby corrected as shown below:

Column 14, line 5, "charges" should be ---changes---.

Column 15, line 18, "bivary" should be ---binary---.

Column 16, line 28, after "to" insert ---a---.

Signed and Sealed this

Twenty-fifth Day of August 1981

[SEAL]

*Attest:*

*Attesting Officer*

GERALD J. MOSSINGHOFF
*Commissioner of Patents and Trademarks*